US010821402B2

(12) United States Patent
Huang et al.

(10) Patent No.: US 10,821,402 B2
(45) Date of Patent: Nov. 3, 2020

(54) AUTOMATIC ARRANGING MACHINE FOR MEMBRANE FIBER AND MEMBRANE MODULE PRODUCTION DEVICE THEREOF

(71) Applicant: Dongguan University of Technology, Guangdong (CN)

(72) Inventors: Simin Huang, Guangdong (CN); Kui He, Guangdong (CN)

(73) Assignee: Dongguan University of Technology, Guangdong (CN)

( * ) Notice: Subject to any disclaimer, the term of this patent is extended or adjusted under 35 U.S.C. 154(b) by 144 days.

(21) Appl. No.: 16/114,216

(22) Filed: Aug. 28, 2018

(65) Prior Publication Data
US 2019/0314764 A1 Oct. 17, 2019

(30) Foreign Application Priority Data

Apr. 13, 2018 (CN) .......................... 2018 1 0332953

(51) Int. Cl.
*B01D 63/02* (2006.01)
*B01D 61/02* (2006.01)
(Continued)

(52) U.S. Cl.
CPC ......... *B01D 63/028* (2013.01); *B01D 61/025* (2013.01); *B01D 67/0009* (2013.01);
(Continued)

(58) Field of Classification Search
CPC .. B01D 61/025; B01D 61/243; B01D 63/021; B01D 63/022; B01D 63/028;
(Continued)

(56) References Cited

U.S. PATENT DOCUMENTS 3,801,401 A * 4/1974 Cope ...................... B01D 53/22
156/172
4,038,190 A * 7/1977 Baudet ................... B01D 46/02
210/321.81
(Continued)

FOREIGN PATENT DOCUMENTS

CN 101450284 6/2009
CN 101829471 9/2010
(Continued)

*Primary Examiner* — Michael A Tolin
(74) *Attorney, Agent, or Firm* — JCIPRNET

(57) ABSTRACT

An automatic arranging machine for membrane fiber which comprises a workbench, and a membrane fiber reel, a membrane fiber guide plate, a first membrane fiber traction apparatus, a membrane fiber cutter, a membrane fiber bracket and a second membrane fiber traction apparatus which are sequentially arranged and mounted on the workbench. The invention provides an automatic arranging machine for membrane fiber and a membrane module production device, which mainly rely on a membrane fiber automatic filling machine to accurately control the membrane fiber, and realize passing the automatic membrane fiber through the membrane fiber bracket into a membrane tube by using the membrane fiber traction apparatus to cooperate with a related mechanical walking structure. The automatic control technology utilized in the whole process is mature, the manual intervention process is less, the consumables are used less, the manufactured components are with high quality, the production efficiency is high, and the produced membrane module has a good performance consistency and can be applied to the manufacturing process of many membrane separation modules.

12 Claims, 3 Drawing Sheets

(51) Int. Cl.
 *B29C 39/10* (2006.01)
 *B01D 67/00* (2006.01)
 *C02F 1/44* (2006.01)
 *B01D 61/58* (2006.01)

(52) U.S. Cl.
 CPC .............. *B29C 39/10* (2013.01); *C02F 1/44* (2013.01); *B01D 61/58* (2013.01); *B01D 63/021* (2013.01)

(58) Field of Classification Search
 CPC .. B01D 63/029; B01D 2323/42; B29C 39/08; B29C 39/10
 See application file for complete search history.

(56) References Cited

U.S. PATENT DOCUMENTS

| 9,283,727 B2* | 3/2016 | Hattori | B01D 69/08 |
| 10,213,745 B2* | 2/2019 | Shevitz | B01D 63/024 |

FOREIGN PATENT DOCUMENTS

| CN | 104890231 | 9/2015 |
| CN | 103495344 | 9/2016 |

* cited by examiner

AUTOMATIC ARRANGING MACHINE FOR MEMBRANE FIBER AND MEMBRANE MODULE PRODUCTION DEVICE THEREOF

CROSS-REFERENCE TO RELATED APPLICATION

This application claims the priority benefit of China application serial no. 201810332953.6, filed on Apr. 13, 2018. The entirety of the above-mentioned patent application is hereby incorporated by reference herein and made a part of this specification.

BACKGROUND

Technical Field

The invention relates to a technical field of gas-liquid membrane separation, and in particular relates to an automatic arranging machine for membrane fiber and a membrane module production device.

Description of Related Art

Membrane separation technology is widely used in desalination of seawater, water treatment, biomedical treatment and many other modern industrial technical fields. Membrane module is a key component in a variety of membrane separation industries, and its processing technology and related devices have important economic value. The technology in which an organic membrane is used as a main material of the membrane module accounts for about 50%. The organic membrane has outstanding advantages of corrosion resistance and low cost. However, at present, the processing technology using an organic hollow fiber membrane fails to achieve mechanization and such processed modules are not consistent in performance. The quality and performance of the membrane module are not only affected by the membrane itself, uneven arrangement of a membrane tube caused during processing of the membrane module and damage of the membrane tube caused during a gel-filling process also have great influence on the performance of the module. According to testing experiment of the membrane module, uneven arrangement of the membrane fiber has a great influence on the overall performance of the module, and in some cases, the performance of the module is reduced by 50%.

An important reason why it is difficult to automate the processing of the membrane module is that the hollow fiber membrane made of organic material is not as rigid as a ceramic membrane. A bending deformation will occur when the membrane suffers a relatively small force.

With increasing use of the membrane separation technology, automation of the processing of the membrane module and better quality of the module itself are required. Therefore, to develop an automated technology and equipment for producing hollow fiber membrane module in regular arrangement becomes an urgent need in the field of membrane separation technology.

Chinese patent No. CN101829471A discloses a method for manufacturing a nanofiltration membrane component, which is mainly processed in a manual way and fails to realize the automation of the processing. Chinese patent No. CN104890231A discloses a reverse osmosis membrane component heat sealing system and method, which requires fixing the membrane fiber by a heat sealing mold and packaging the module via instant heating and cooling, but this method does not have the technology to ensure the regular arrangement of the membrane fiber. Chinese patent No. CN101450284 discloses an efficient hollow fiber membrane module device and method, which realizes regular arrangement of fibers and prevents the membrane fibers from tangling during operation by a separation net disposed between the fibers, but it does not fulfill the requirement of automated processing. However, heating of the separation net increases the resistance during operation. Chinese patent No. CN103495344B discloses a packaging method of a hollow fiber curtain-type membrane module, which uses a seal head fixture rack to fix the membrane fibers and then cuts off the membrane fibers for packaging, but this process does not involve an automated manufacturing technology.

SUMMARY OF THE INVENTION

In order to overcome the deficiencies of the prior art, an object of the present invention is to provide an automatic arranging machine for membrane fiber and a membrane module production device. In order to solve the problems of automated production of a membrane module and improves the quality of the membrane module, a process of using the equipment is simple and consumables used in the production process are less.

In order to solve the abovementioned problems, the technical solution adopted by the present invention is as follows.

An automatic arranging machine for membrane fiber includes a workbench, a membrane fiber reel, a membrane fiber guide plate, a first membrane fiber traction apparatus, a membrane fiber cutter, a membrane fiber bracket and a second membrane fiber traction apparatus which are sequentially arranged and mounted on the workbench. The membrane fiber reel includes a bracket member and a reel member rotatably connected to the bracket member. The reel member is used for winding the membrane fiber. The membrane fiber bracket is disposed between the first membrane fiber traction apparatus and the second membrane fiber traction apparatus. The membrane fiber bracket is provided with a hole for the membrane fiber passing therethrough. Bottom portions of the first membrane fiber traction apparatus and the second membrane fiber traction apparatus are respectively and slidably mounted on the workbench via one guide rail. The first membrane fiber traction apparatus and the second membrane fiber traction apparatus are provided with holes for the membrane fiber passing therethrough. The first membrane fiber traction apparatus and the second membrane fiber traction apparatus are used for pulling the membrane fiber to pass through the membrane fiber bracket. Distribution of the hole on the first membrane fiber traction apparatus, distribution of the hole on the second membrane fiber traction apparatus and distribution of the hole on the membrane fiber bracket correspond to one another. A bottom portion of the membrane fiber guide plate is fixed on the workbench. The membrane fiber guide plate is disposed between the membrane fiber reel and the first membrane fiber traction apparatus. The membrane fiber guide plate is provided with a hole which corresponds to the hole on the first membrane fiber traction apparatus and the hole on the membrane fiber bracket. The hole of the first membrane fiber guide plate is adapted for guiding the membrane fiber during transfer of the membrane fiber. The membrane fiber cutter is disposed between the first membrane fiber traction apparatus and the membrane fiber bracket for cutting off the membrane fiber.

Further, the membrane fiber cutter is a carbon dioxide laser.

Further, the first membrane fiber traction apparatus and the second membrane fiber traction apparatus respectively includes one moving plate and one fixed plate. The moving plate and the fixed plate are respectively provided with a hole for the membrane fiber passing therethrough. Distribution of the hole on the moving plate corresponds to distribution of the hole on the fixed plate. The fixed plate is slidably mounted on the workbench via one guide rail. The fixed plate is further provided with a guiding groove and a cam. The moving plate is slidably disposed in the guiding groove. The cam is controlled by a motor and pushes the moving plate to slide in the guiding groove. When the moving plate slides in the guiding groove, the hole on the moving plate and the hole on the fixed plate are misaligned with each other.

Further, the first membrane fiber traction apparatus and the second membrane fiber traction apparatus respectively include one moving plate and one fixed plate. The moving plate and the fixed plate are respectively provided with a hole for the membrane fiber passing therethrough. Distribution of the hole on the moving plate corresponds to distribution of the hole on the fixed plate. The fixed plate is slidably mounted on the workbench via one guide rail. A rotating motor is disposed on the fixed plate. The moving plate is relatively rotatably mounted on the fixed plate by the rotating motor. When the rotating motor controls the relative rotation of the moving plate on the fixed plate, the hole on the moving plate and the hole on the fixed plate are misaligned with each other.

Further, the automatic arranging machine for membrane fiber further includes a membrane fiber suction equipment. The membrane fiber suction equipment is disposed on a side of the second membrane fiber traction apparatus facing away from the membrane fiber bracket. The membrane fiber suction equipment includes a base and a panel fixed on the base. The panel is provided with a plurality of suction plates corresponding in position to the hole on the first membrane fiber traction apparatus, the hole on the second membrane fiber traction apparatus and the hole on the membrane fiber bracket. The panel is formed with a cavity therein. The cavity connects each of the suction plates with one vacuum pump.

Further, the suction plates on the membrane fiber suction equipment are protruding tubular-shaped. A diameter of each of the suction plates matches a diameter of the hole on the first membrane fiber traction apparatus, a diameter of the hole on the membrane fiber bracket and a diameter of the hole on the second membrane fiber traction apparatus, so that when membrane fiber suction equipment, the first membrane fiber traction apparatus, the membrane fiber bracket and the second membrane fiber traction apparatus are attached to each other, the holes on the membrane fiber suction equipment, the first membrane fiber traction apparatus, the membrane fiber bracket and the second membrane fiber traction apparatus are in communication and airtightness with each other, so that a suction force of each of the suction plates is conducted in the holes.

A membrane module production device includes the above-mentioned automatic arranging machine for membrane fiber, and further includes a module casing machine and a module glue-filling machine. The module glue-filling machine includes a glue mixer, a peristaltic pump, a conveying pipe and a centrifuge which are sequentially-connected.

In comparison with the prior art, beneficial effects of the present invention are described in the following.

The invention provides an automatic arranging machine for membrane fiber and a membrane module production device, which mainly rely on a membrane fiber automatic filling machine to accurately control the membrane fiber, and realize automatic passage of the membrane fiber bracket into a membrane tube by using the membrane fiber traction apparatus to cooperate with a related mechanical walking structure. After the membrane fiber is placed in a module casing, the glue is filled in and is evenly distributed by the centrifuge. Since the membrane fiber is protected by the membrane fiber bracket, the membrane fiber would not deform or be damaged during the centrifugation and a drying process of the glue. The automatic control technology utilized in the whole process is mature, the manual intervention process is less, the consumables being used are less, the manufactured components are with high quality, the production efficiency is high, and the produced membrane module has a good consistency in performance and can be applied to the manufacturing process of many membrane separation modules.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The present invention will be further described below with reference to the accompanied drawings and specific embodiments.

First Embodiment

Figure 1:
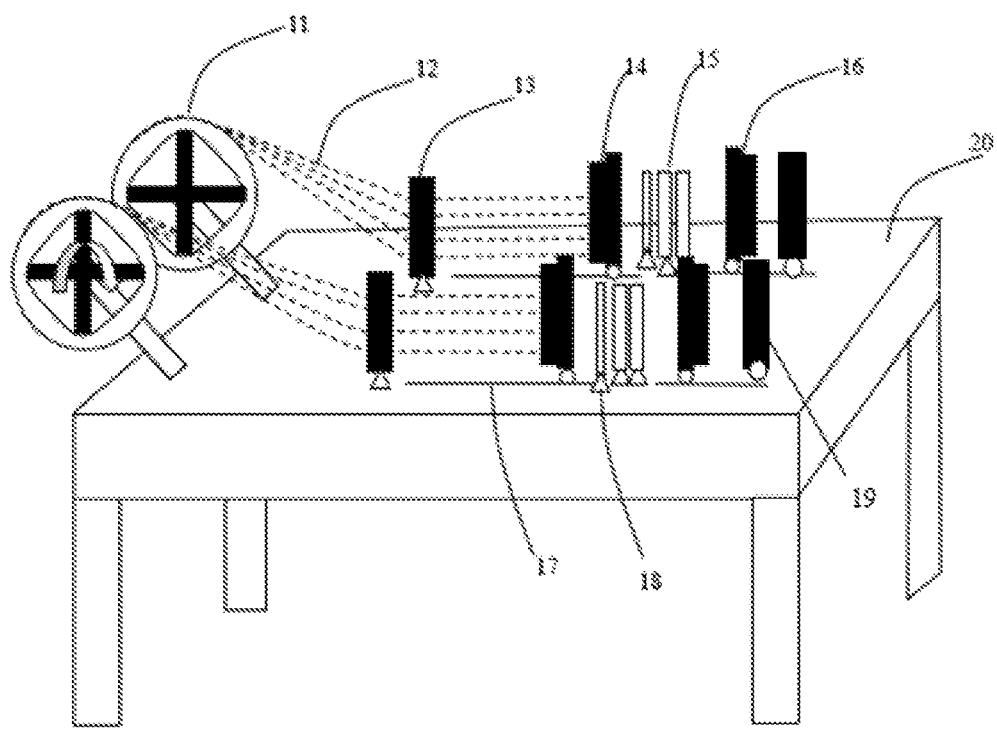
FIG. 1 is a structure diagram of an automatic arranging machine for membrane fiber according to a first embodiment of the present invention.
Figure 2:
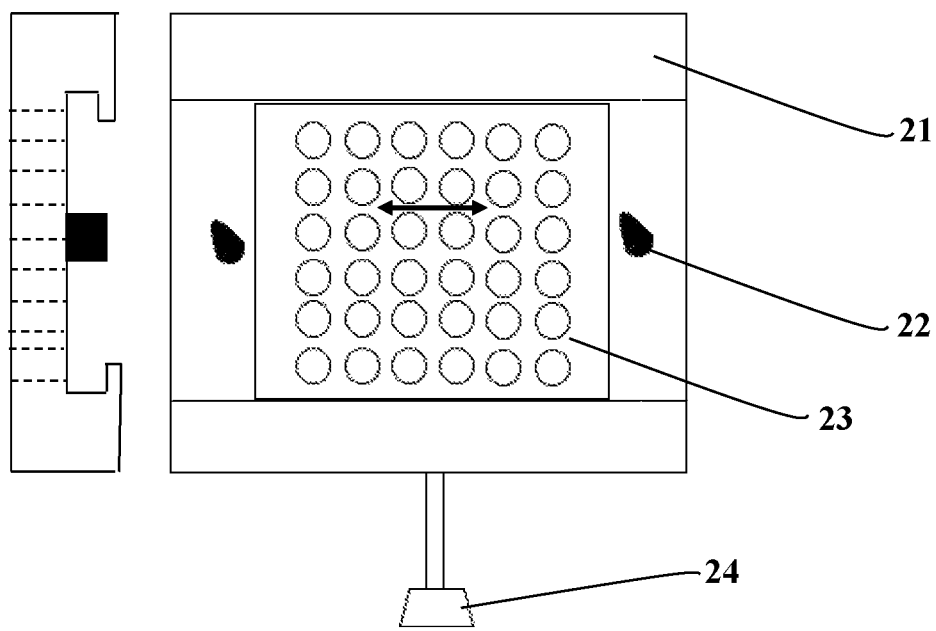
FIG. 2 is a structure diagram of a membrane fiber traction apparatus according to the first embodiment of the present invention.
Figure 3:
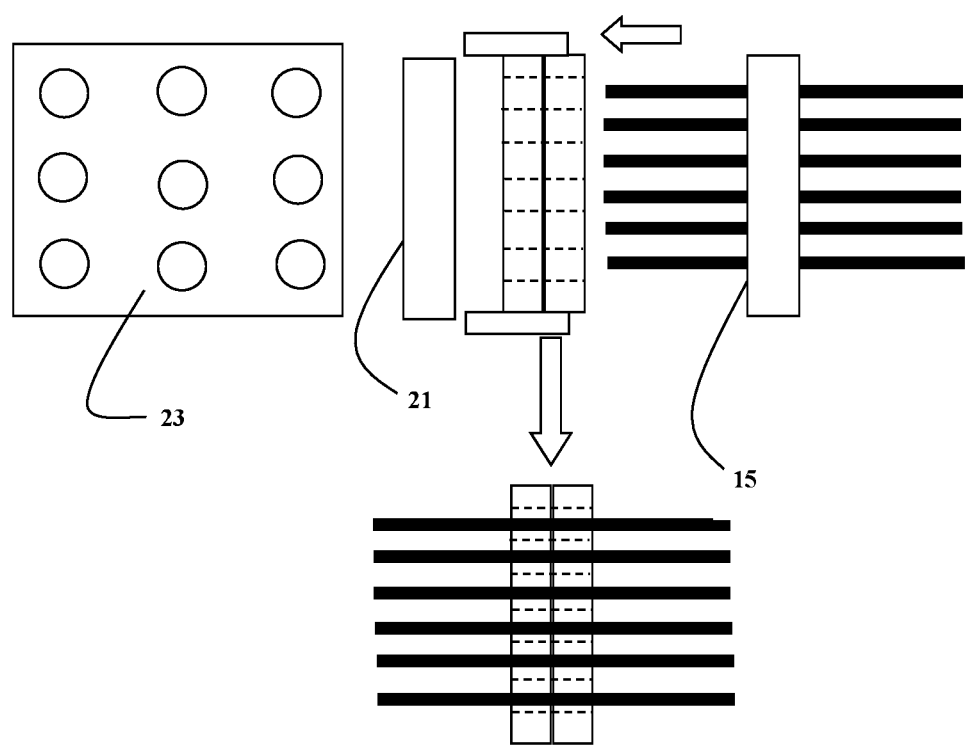
FIG. 3 is a working principle diagram of the membrane fiber traction apparatus according to the first embodiment of the present invention.

As shown in FIG. 1 to FIG. 3, the present invention provides an automatic arranging machine for membrane fiber which includes a workbench 20, a membrane fiber reel 11, a membrane fiber guide plate 13, a first membrane fiber traction apparatus 14, a membrane fiber cutter 18, a membrane fiber bracket 15, a membrane fiber traction apparatus 16 and a membrane fiber suction equipment 19 which are sequentially arranged and mounted on the workbench 20.

The membrane fiber reel 11 includes a bracket member and a reel member rotatably connected to the bracket member. The reel member is used for winding the membrane fiber 12. A diameter of the membrane fiber reel 11 ranges from 300 millimeter to 400 millimeter and its rotation speed can be controlled by a computer, so as to cooperate with operation of the membrane fiber traction apparatus. The rotation speed is slow to prevent a tension in the membrane fiber 12 from being excessively large, and to prevent the membrane fiber from damage.

The membrane fiber bracket 15 is disposed between the first membrane fiber traction apparatus 14 and the second membrane fiber traction apparatus 16. The membrane fiber bracket 15 is provided with a hole for the membrane fiber passing therethrough. The membrane fiber bracket 15 is printed and manufactured on a plexiglass by a laser printer, and a spatial position of the hole and a shape of the bracket are determined by a number of the membrane to be filled in and a specific form of the membrane module, in order to achieve precisely matching with a membrane module casing.

Bottom portions of the first membrane fiber traction apparatuses 14 and the second membrane fiber traction apparatuses 16 are respectively and slidably mounted on the workbench 20 via one guide rail 17. The first membrane fiber traction apparatus 14 and the second membrane fiber traction apparatus 16 are provided with holes for the membrane fiber 12 to pass therethrough. The first membrane fiber traction apparatus 14 and the second membrane fiber traction apparatus 16 are used for pulling the membrane fiber 12 to pass through the membrane fiber bracket 15. Distribution of the hole on the first membrane fiber traction apparatus 14, distribution of the hole on the second membrane fiber traction apparatus 16 and distribution of the hole on the membrane fiber bracket 15 correspond to one another. Diameters of the holes on the first membrane fiber traction apparatus 14 and the second membrane fiber traction apparatus 16 are about 100 microns larger than a diameter of the membrane fiber 12, such structural design can be achieved by machining.

A bottom portion of the membrane fiber guide plate 13 is fixed on the workbench 20. The membrane fiber guide plate 13 is disposed between the membrane fiber reel 11 and the first membrane fiber traction apparatus 14. The membrane fiber guide plate 13 is provided with a hole which corresponds to the hole on the first membrane fiber traction apparatus 14 and the hole on the membrane fiber bracket 15. The hole of the membrane fiber guide plate 13 is adapted for guiding the membrane fiber 12 during transfer of the membrane fiber 12. Its function is to adjust a curvature of the membrane fiber 12 and to prevent the membrane fiber 12 from tangling.

The membrane fiber suction equipment 19 is disposed on a side of the second membrane fiber traction apparatus 16 facing away from the membrane fiber bracket 15, which is used for passing the membrane fiber 12 through the membrane fiber bracket 15 and the second membrane fiber traction apparatus 16 by a suction.

The membrane fiber cutter 18 is disposed between the first membrane fiber traction apparatus 14 and the membrane fiber bracket 15 for cutting off the membrane fiber 12. In the embodiment of the present invention, a carbon dioxide laser is used as the membrane fiber cutter 18 which can realize a non-destructive cutting on the membrane fiber 12.

As shown in FIG. 2, this embodiment provides a viable membrane fiber traction apparatus design which is applied to the case where the membrane fiber bracket 15 has a rectangular cross section. Specifically, the first membrane fiber traction apparatuses 14 and the second membrane fiber traction apparatuses 16 respectively include one moving plate 23 and one fixed plate 21. The moving plate 23 and the fixed plate 21 are respectively provided with a hole for the membrane fiber 12 to pass therethrough. Distribution of the hole on the moving plate 23 corresponds to distribution of the hole on the fixed plate 21. The fixed plate 21 is mounted on one fixed base 24 and is slidably mounted on the workbench 20 via one guide rail 17. The fixed plate 21 is further provided with a guiding groove and a cam 22. The moving plate 23 is slidably disposed in the guiding groove. The cam 22 is controlled by a motor for pushing the moving plate 23 to slide in the guiding groove. When the moving plate 23 slides in the guiding groove, the hole on the moving plate 23 and the hole on the fixed plate 21 are misaligned or aligned with each other.

When this embodiment is used, first, the membrane fiber 12 in the membrane fiber reel 11 is sequentially passed through the membrane fiber guide plate 13 and the first membrane fiber traction apparatus 14, and the membrane fiber 12 is guided and penetrated into the hole of the membrane fiber bracket 15. After the membrane fiber 12 is penetrated into membrane fiber bracket 15, the first membrane fiber traction apparatus 14 loosens the membrane fiber 12, and then the second membrane fiber traction apparatus 16 and the membrane fiber suction equipment 19 are used to pull the membrane fiber 12 from another side of the membrane fiber bracket 15 for a certain length. Finally, the membrane fiber cutter 18 cuts off the membrane fiber 12 to complete a threading action. In accordance with this cycle, the abovementioned threading action can be repeated to complete the threading work of a plurality of membrane fiber brackets 15.

Further, the working principle of the membrane fiber traction apparatus in this embodiment is as follows.

As shown in FIG. 3, before starting the automatic arranging machine for membrane fiber, the membrane fiber 12 is manually penetrated into the holes on the moving plate 23 and the fixed plate 21 of the first membrane fiber traction apparatus 14. The diameter of the membrane fiber 12 is slightly smaller than the diameter of the holes. After the membrane fiber 12 is penetrated into the holes, the moving plate 23 moves under the drive of the cam 22. The relative position of the moving plate 23 and the fixed plate 21 changes, and the hole on the moving plate 23 and the hole on the fixed plate 21 are no longer aligned. Thereby, a slight shear force is generated on the membrane fiber 12, and the membrane fiber 12 is clamped so that the membrane fiber 12 is relatively fixed to the first membrane fiber traction apparatus 14. Under the drive of the guide rail 17 at the bottom of the fixed plate 21, the membrane fiber 12 is pulled by the first membrane fiber traction apparatus 14 and is moved toward the membrane fiber bracket 15. The membrane fiber is partially exposed to the first membrane fiber traction apparatus 14, and a spatial position of the membrane fiber 12 is fixed by the hole on the first membrane fiber traction apparatus 14. Since the hole on the membrane fiber bracket 15 and the hole on the membrane fiber traction apparatus 14 are aligned, the first membrane fiber traction apparatus 14 can align the membrane fiber 12 to the membrane fiber bracket 15. After the first membrane fiber traction apparatus 14 aligns the membrane fiber 12 to the membrane fiber bracket 15, on the another side of the membrane fiber bracket 15, the second membrane fiber traction apparatus 16 aligns the hole to the hole on the membrane fiber bracket 15 under the drive of the guide rail 17. The membrane fiber 12 is passed through the membrane fiber bracket 15 with an aid of the membrane fiber suction equipment 19 and is further sucked into the hole on the second membrane fiber traction apparatus 16. An automatic control system makes the moving plate 23 and the fixed plate 21 of the first membrane fiber traction apparatus 14 return, and drives the moving plate 23 and the fixed plate 21 of the second membrane fiber traction apparatus 16 to be misaligned. The membrane fiber 12 is clamped by the second membrane fiber traction apparatus 16 and is no longer clamped by the first membrane fiber traction apparatus 14, so that the second membrane fiber traction apparatus 16 can continue pulling the membrane fiber 12 along a sliding direction of the guide rail 17. Until the length of the membrane fiber 12 reaches a set length, the automatic control system drives the membrane fiber cutter 18 to cut off the membrane fiber 12, and the entire threading work is completed.

Figure 4:
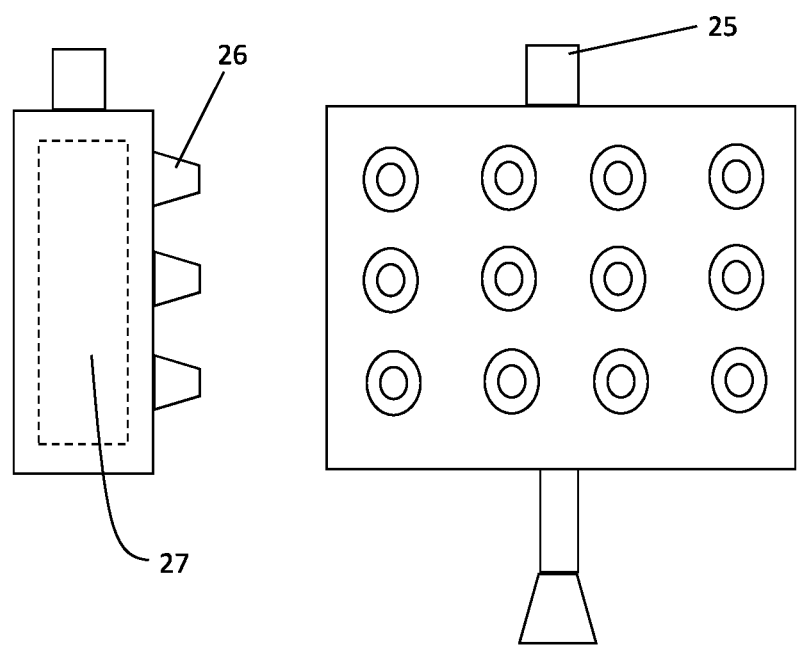
FIG. 4 is a structure diagram of a membrane fiber suction equipment according to the first embodiment of the present invention.

Further, as shown in FIG. 4, the membrane fiber suction equipment 19 includes a base and a panel fixed on the base. The panel is provided with a plurality of suction plates 26. Distributing positions of the plurality of suction plates 26 correspond to the position of hole on the first membrane fiber traction apparatuses 14, the position of hole on the second membrane fiber traction apparatuses 16 and the position of hole on the membrane fiber brackets 15. The panel is formed with a cavity 27 therein. The cavity 27 is provided with a connector 25. The cavity 27 connects each of the suction plates 26 with one vacuum pump. A sufficient negative pressure is generated in the cavity 27 via the vacuum pump, and the vacuum pump generates a suction, thereby enabling the membrane fiber 12 in the hole of the first membrane fiber traction apparatus 14 to be sucked into the holes on the membrane fiber bracket 15 and the second membrane fiber traction apparatus 16, so as to achieve the threading work.

As an improvement, the suction plates 26 on the membrane fiber suction equipment 19 are protruding tubular-shaped. A diameter of each of the suction plates 26 matches the diameter of the hole on the first membrane fiber traction apparatuses 14, the diameter of the hole on the membrane fiber brackets 15 and the diameter of the hole on the second membrane fiber traction apparatus 16, so that when the membrane fiber suction equipment 19, the first membrane fiber traction apparatus 14, membrane fiber bracket 15 and the second membrane fiber traction apparatus 16 are attached to each other, the holes on the membrane fiber suction equipment, the first membrane fiber traction apparatus, the membrane fiber bracket and the second membrane fiber traction apparatus are in communication and airtightness with each other, so that the suction force of each of the suction plates 26 is conducted in the holes.

Second Embodiment

Figure 5:
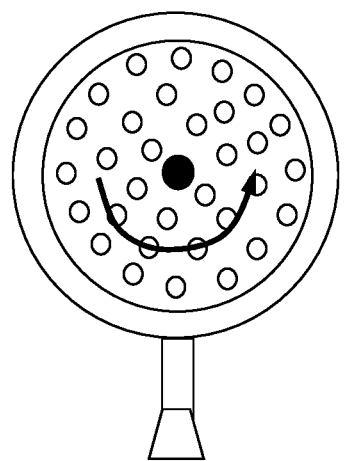
FIG. 5 is a structure diagram of a membrane fiber traction apparatus according to a second embodiment of the present invention.

As shown in FIG. 4 and FIG. 5, this embodiment proposes another design of the membrane fiber traction apparatus based on the first embodiment. The membrane fiber traction apparatus in the second embodiment is designed based on a membrane module having a circular cross section.

Specifically, the first membrane fiber traction apparatus 14 and the second membrane fiber traction apparatus 16 respectively include one moving plate 23 and one fixed plate 21. The moving plate 23 and the fixed plate 21 are respectively provided with a hole for the membrane fiber 12 to pass therethrough. The distribution of hole on the moving plate 23 corresponds to the distribution of the hole on the fixed plate 21. The fixed plate 21 is slidably mounted on the workbench 20 via one guide rail 17. A rotating motor is disposed on the fixed plate 21. The moving plate 23 is relatively rotatably mounted on the fixed plate 21 via the rotating motor. When the rotating motor controls the moving plate 23 to rotate relatively on the fixed plates 21, the hole on the moving plate 23 and the hole on the fixed plate 21 are misaligned with each other.

It should be noted that, in this embodiment, the circular cross section of the membrane module does not mean that the distribution of the holes on the fixed plate 21 and the moving plate 23 is circular as a whole. As shown in FIG. 4 and FIG. 5, the distribution of the holes on the moving plate 23 and the fixed plate 21 should be arranged based on the actual arrangement of the membrane fiber in the membrane module, which may be circular or rectangular or of other shapes.

The working principle of the membrane fiber traction apparatus in this embodiment is similar to that of the first embodiment, which only a sliding misaligned mode driven by the cam 22 is changed to a rotary misaligned mode, so description of the working process will not be repeated here for the brevity.

Third Embodiment

Figure 6:
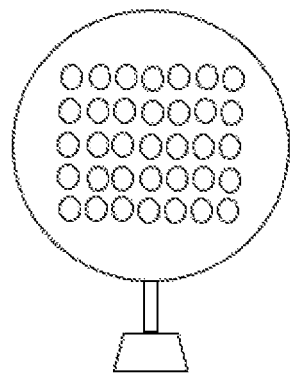
FIG. 6 is another structure diagram of the membrane fiber traction apparatus according to the second embodiment of the present invention.
Figure 7:
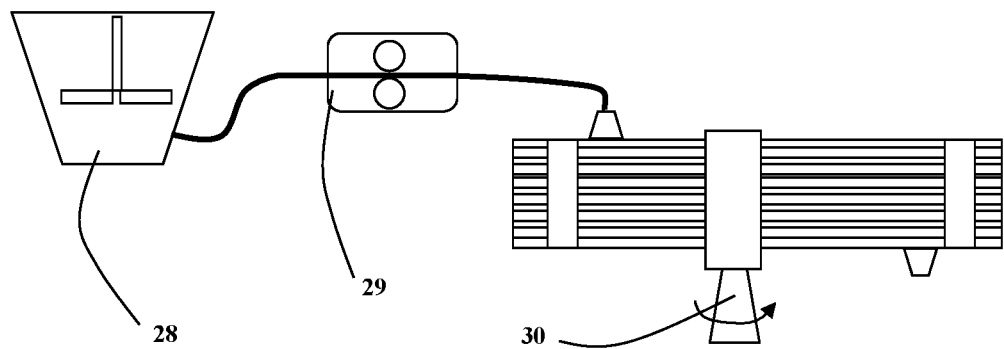
FIG. 7 is a structure diagram of an automatic glue-filling machine according to a third embodiment of the present invention.

As shown in FIG. 6, this embodiment provides a membrane module production device including the automatic arranging machines for membrane fiber as described in the first embodiment and the second embodiment 2. The membrane module production device further includes a module casing machine and a module glue-filling machine. The module casing machine is used for installation of the membrane fiber bracket 15. The module glue-filling machine includes a glue mixer 28, a peristaltic pump 29, a conveying pipe and a centrifuge 30 which are sequentially connected. Movements of all such mechanisms are controlled by computer automation.

In this embodiment, when the membrane module production device provided is in operation, a semi-finished product of a membrane fiber bundle with the membrane fiber bracket 15 is loaded into a preformed membrane module casing through the module casing machine, and then is loaded into the centrifuge 30. Mixed resin glue is sequentially conveyed to both ends of the membrane module casing through the glue mixer 28 and the peristaltic pump 29, and the centrifuge 30 is started to evenly distribute the glue around the membrane fiber, and a membrane module is formed after the sealant (i.e., glue) is dried.

The above embodiments are merely preferred embodiments of the present invention, and the scope of the present invention is not limited thereto, and any insubstantial changes or substitutions made by those skilled in the art based on the present invention belong to the scope of protection claimed in the present invention.

What is claimed is:

1. An automatic arranging machine for membrane fibers, the automatic arranging machine comprising a workbench, a membrane fiber reel, a membrane fiber guide plate, a first membrane fiber traction apparatus, a membrane fiber cutter, a membrane fiber bracket and a second membrane fiber traction apparatus which are sequentially arranged and mounted on the workbench;

wherein the membrane fiber reel includes a bracket member and a reel member rotatably connected to the bracket member, and the reel member is adapted for winding the membrane fibers;

wherein the membrane fiber bracket is disposed between the first membrane fiber traction apparatus and the second membrane fiber traction apparatus, and the membrane fiber bracket is provided with holes for the membrane fibers to pass therethrough, each hole allowing one of the membrane fibers to pass therethrough;

wherein bottom portions of the first membrane fiber traction apparatus and the second membrane fiber traction apparatus are respectively and slidably mounted on the workbench via one guide rail, the first membrane fiber traction apparatus and the second membrane fiber traction apparatus are provided with holes for the membrane fibers to pass therethrough, the first membrane fiber traction apparatus and the second membrane fiber traction apparatus are adapted for pulling the membrane fibers to pass through the membrane fiber bracket, and a distribution of the holes of the first membrane fiber traction apparatus, a distribution of the holes of the second membrane fiber traction apparatus and a distribution of the holes of the membrane fiber bracket correspond to one another;

wherein a bottom portion of the membrane fiber guide plate is fixed on the workbench, the membrane fiber guide plate is disposed between the membrane fiber reel and the first membrane fiber traction apparatus, and the membrane fiber guide plate is provided with holes which correspond to the holes of the first membrane fiber traction apparatus and the holes of the membrane fiber bracket, the holes of the first membrane fiber guide plate are adapted for guiding the membrane fibers during passage of the membrane fibers therethrough; and wherein the membrane fiber cutter is disposed between the first membrane fiber traction apparatus and the membrane fiber bracket for cutting off the membrane fibers.

2. A membrane module production device, comprising an automatic arranging machine for membrane fibers as claimed in claim 1, the membrane module production device further comprising a module glue-filling machine, wherein the module glue-filling machine includes a glue mixer, a peristaltic pump, a conveying pipe and a centrifuge which are sequentially-connected.

3. The automatic arranging machine for membrane fibers according to claim 1, wherein the membrane fiber cutter is a carbon dioxide laser.

4. A membrane module production device, comprising an automatic arranging machine for membrane fibers as claimed in claim 3, the membrane module production device further comprising a module glue-filling machine, wherein the module glue-filling machine includes a glue mixer, a peristaltic pump, a conveying pipe and a centrifuge which are sequentially-connected.

5. The automatic arranging machine for membrane fibers according to claim 1, wherein the first membrane fiber traction apparatus and the second membrane fiber traction apparatus respectively include one moving plate and one fixed plate, the moving plate and the fixed plate are respectively provided with holes for the membrane fiber to pass therethrough, a distribution of the holes of the moving plate corresponds to a distribution of the holes of the fixed plate, the fixed plate is slidably mounted on the workbench via the one guide rail, the fixed plate is further provided with a guiding groove and a cam, the moving plate is slidably disposed in the guiding groove, the cam is controlled by a motor and pushes the moving plate to slide in the guiding groove, and when the moving plate slides in the guiding groove, the holes of the moving plate and the holes of the fixed plate are misaligned with each other.

6. A membrane module production device, comprising an automatic arranging machine for membrane fibers as claimed in claim 5, the membrane module production device further comprising a module glue-filling machine, wherein the module glue-filling machine includes a glue mixer, a peristaltic pump, a conveying pipe and a centrifuge which are sequentially-connected.

7. The automatic arranging machine for membrane fibers according to claim 1, wherein the first membrane fiber traction apparatus and the second membrane fiber traction apparatus respectively include one moving plate and one fixed plate, the moving plate and the fixed plate are respectively provided with holes for the membrane fibers to pass therethrough, a distribution of the holes of the moving plate corresponds to a distribution of the holes of the fixed plate, the fixed plate is slidably mounted on the workbench via one guide rail, a rotating motor is disposed on the fixed plate, the moving plate is relatively rotatably mounted on the fixed plate via the rotating motor, and when the rotating motor controls the moving plate to relatively rotate on the fixed plate, the holes of the moving plate and the holes of the fixed plate are misaligned with each other.

8. A membrane module production device, comprising an automatic arranging machine for membrane fibers as claimed in claim 7, the membrane module production device further comprising a module glue-filling machine, wherein the module glue-filling machine includes a glue mixer, a peristaltic pump, a conveying pipe and a centrifuge which are sequentially-connected.

9. The automatic arranging machine for membrane fibers according to claim 1, the automatic arranging machine further comprising a membrane fiber suction equipment, wherein the membrane fiber suction equipment is disposed on a side of the second membrane fiber traction apparatus facing away from the membrane fiber bracket, the membrane fiber suction equipment includes a base and a panel fixed on the base, the panel is provided with a plurality of suction plates corresponding in position to the holes of the first membrane fiber traction apparatus, the holes of the second membrane fiber traction apparatus and the holes of the membrane fiber bracket, the panel is formed with a cavity therein, and the cavity is adapted to connect each of the suction plates with one vacuum pump.

10. A membrane module production device, comprising an automatic arranging machine for membrane fibers as claimed in claim 9, the membrane module production device further comprising a module glue-filling machine, wherein the module glue-filling machine includes a glue mixer, a peristaltic pump, a conveying pipe and a centrifuge which are sequentially-connected.

11. The automatic arranging machine for membrane fibers according to claim 9, wherein the suction plates protrude from a surface of the panel, the suction plates on the membrane fiber suction equipment protrude in a tubular shape, and a diameter of each of the suction plates matches a diameter of the holes of the first membrane fiber traction apparatus, a diameter of the holes of the membrane fiber bracket and a diameter of the holes of the second membrane fiber traction apparatus, so that when the membrane fiber suction equipment, the first membrane fiber traction apparatus, the membrane fiber bracket and the second membrane fiber traction apparatus are attached to each other, the holes of the membrane fiber suction equipment, the first membrane fiber traction apparatus, the membrane fiber bracket and the second membrane fiber traction apparatus are in communication and airtightness with each other, so that a suction force of each of the suction plates is conducted in the holes.

12. A membrane module production device, comprising an automatic arranging machine for membrane fibers as claimed in claim 11, the membrane module production device further comprising a module glue-filling machine, wherein the module glue-filling machine includes a glue mixer, a peristaltic pump, a conveying pipe and a centrifuge which are sequentially-connected.

* * * * *